UNITED STATES PATENT OFFICE.

ALFRED W. WOOLCOTT, OF COFFEYVILLE, KANSAS, ASSIGNOR OF ONE-HALF TO REA-PATTERSON MILLING COMPANY, OF COFFEYVILLE, KANSAS, A CORPORATION OF KANSAS.

FLOUR-MILLING PROCESS.

1,424,608.    Specification of Letters Patent.    Patented Aug. 1, 1922.

Application filed December 20, 1919. Serial No. 346,290.

*To all whom it may concern:*

Be it known that I, ALFRED W. WOOLCOTT, a citizen of the United States, residing in the city of Coffeyville, county of Montgomery, and State of Kansas, have invented new and useful Improvements in Flour-Milling Processes, of which the following is a specification.

This invention relates to a novel method for use in milling flour and has for its general object to provide for purifying air, imparting thereto a given temperature, either warmer, or cooler than that of the atmospheric air, regulating the moisture content of such air and then conducting it to the individual machines of a flour mill where the use of such air is desired.

It has heretofore been proposed to increase the moisture content of air by causing the air to pass through a spray of water, or to bubble the air through a body of water and then pass the air so treated to the machines in the mill. While, so far as I am aware, such a process has never gone into commercial use, an objection to the use of this proposed process will be obvious to those skilled in the art, and resides in the fact that the moisture content of the entire body of air used is increased, and no way is suggested of regulating the amount of moisture, or of providing for different degrees of moisture according to the use to which the air is to be put, or to the stage of milling at which it is to be applied. While it is contemplated in the present invention that all of the air employed shall be purified by passing it through a suitable water spraying machine, it is a salient feature of the invention, and one which differentiates it from all prior attempts to use air which has been thus treated, known to me, that the air after being purified is dried, or substantially deprived of the added moisture, and either the whole body of this air, or individual streams thereof, may be supplied with moisture in regulated quantities, or, be used in the dry state, as occasion may require. Furthermore, the temperature of the air is regulated, being made either warmer or cooler, as circumstances may require; and this feature, while in itself not original with me, constitutes an important step in my improved process as practiced.

In the milling of wheat into flour, it is well known that the weight of flour produced is not in proportion to the quantity or weight of wheat employed, and there exists in all mills what has come to be known as an invisible loss. It is now well known that this loss of weight is occasioned by the evaporation of moisture occurring during the various milling operations, and particularly in the break and reduction rolls, which become quite hot in operation and heat the stock being ground, which necessarily causes moisture therein to be evaporated. Each roll box is commonly supplied with means for producing suction above the rolls, whereby the hot air, with a certain unavoidable amount of the fine ground product, is withdrawn; and such air, with the product, or dust, carried by it is forced by a fan into a dust collector and the valuable content of the air recovered. However, this practice results in continuously withdrawing a certain amount of moisture from the stock, which represents a distinct loss to the miller. This loss is generally considered to run, in the average mill, as high as from 2% to 2½% of the weight of wheat ground.

It is a leading purpose of my invention to enable the miller to avoid the loss above indicated, either by adding the requisite amount of moisture to the stock to compensate for the moisture evaporated, or by using cooled and purified air to prevent to a large extent the occurrence of such loss, the cool air tending to prevent heating of the milling machines; or, and as will generally be the case, by using both cooled and moistened air so as to obtain the cooling of the machines and the addition of moisture to the stock.

It follows from the above that my process enables the miller to deliver finished flour with any desired degree of moisture relative to the moisture content of the initial stock.

An advantage resulting from the use of my improved process resides in the fact that the end product, or flour, is greatly improved, by the use of cool, purified and moistened air, and this improvement resides in a better color, and a less ash content than would obtain in milling under ordinary conditions. It will be obvious that by using only purified air in the various machines, much impurity will be kept out of the flour, which will account in part for an improved color and lower ash content; but the moistened and cooled air, scientifically applied where, and in the quantity, needed, greatly facilitates the milling process, as the miller is enabled to produce and maintain the requisite degree of moisture at all stages of milling, which not only facilitates reduction of the stock but also enables a better separation between the flour, and branny and fibrous material, to be secured. This is another factor tending to improve the color and lower the ash content of the flour.

In addition to the advantages above outlined, a still further advantage resulting from the practice of this process resides in the fact that such part of the ground product as passes to the dust collectors may be more readily recovered, especially if dust collectors of the Cyclone or centrifugal type are employed, as the product will be less dry or dusty and can be more readily separated from the current of air.

A further feature of the invention resides in supplying a suitable gas to the air treated as described which gas may be one adapted to whiten the flour, or to act as a sterilizing agent or germicide. Peroxide of nitrogen diluted with air, for instance, is a well known gas used for whitening flour, and chlorine is another gas used for this purpose, as well as for the purpose of a sterilizing agent or germicide. Either of these gases may be employed in connection with the process.

In proceeding according to my invention, air is first drawn through a washing machine where it is thoroughly purified, and a given temperature imparted to it, which may be either a cool temperature, or, when needed, a warm temperature, the latter being effected by heating the water through which the air is caused to pass. The water is in the form of a spray, or mist, which spray, or mist is produced by a water purifying machine of standard make, and preferably of that type used for surrounding electric generators with purified air. After being washed and purified the air is caused to pass through a series of baffles, known as "eliminators," whereby all free moisture is removed therefrom, so that the air has the same proportionate amount of moisture relative to its temperature, as it had when passed into the purifying machine. The purified air is led by suitable pipes to the various machines, or points of application, and in these pipes, when moisture is required, water is sprayed by an injector in regulated amounts according to the machine through which the air is to be conducted, or to the stage of milling at which moist air is to be applied to the product.

From the foregoing it will be apparent that the purifying of the air has nothing to do with imparting moisture to it, but, as before mentioned, the moisture is separately supplied to the air in the various pipes leading to the respective machines in the mill. This enables the operator to supply purified air of any given temperature and of any given degree of moisture content, or even dry purified air, to the various machines in the mill.

In the accompanying drawings.

Figure 1:
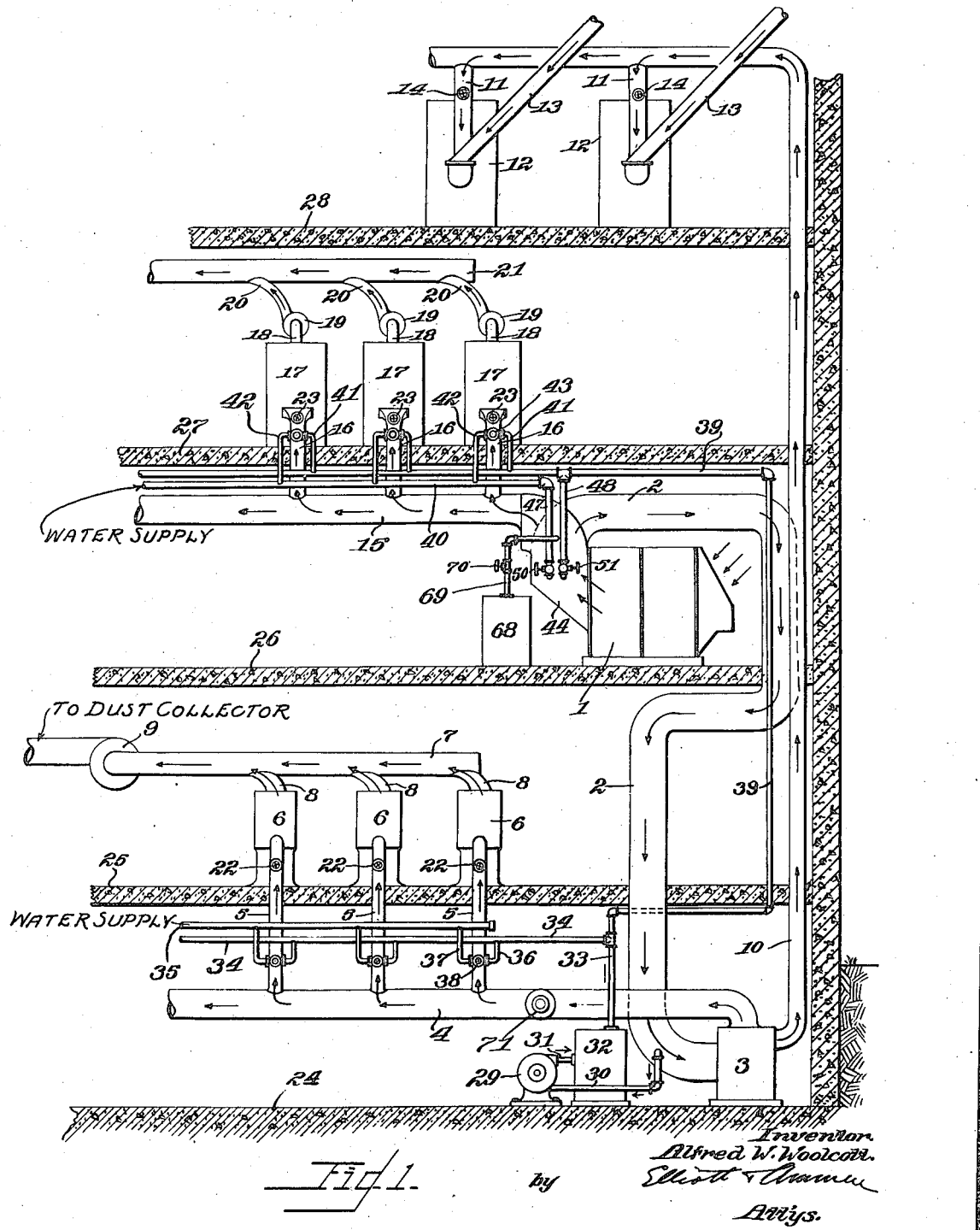
Figure 1 is a diagrammatic view illustrating an installation of apparatus by means of which my improved process may be practiced.

Referring now to these drawings the numeral 1 indicates the air purified through and from which air is withdrawn by means of a pipe 2 which leads into the suction side of a fan casing 3. From the discharge or blast side of the fan casing 3 leads a trunk pipe 4, to which is connected a series of branch pipes 5, each of which leads to a roll box 6, which it enters beneath the plane of the rolls therein. A trunk pipe 7 is connected by means of branch pipes 8 with the top of each roll box, and a combined suction and force fan 9, located in the length of trunk pipe 7, operates to continuously withdraw air from above the rolls in the roll boxes 6 and to blow it into suitable dust collectors. A trunk pipe 10 also leads from the blast side of the fan casing 3, and is connected by means of branch pipes 11 with reels 12, into which stock enters through the chutes 13 along with the air from the pipes 11. Each of the pipes 11 is supplied with a valve 14 for regulating the amount of air supplied to the reels. A trunk pipe 15 also leads from the outlet side of the air purifier 1 and is connected by means of branch pipes 16 with a series of purifiers 17. Each purifier has an air outlet pipe 18 leading to the suction side of a fan 19 the blast side of which is connected by a branch pipe 20 with a trunk pipe 21 which leads to the dust collectors. In the case of the purifiers 17, the fans 19 produce the necessary suction to draw the air through the air purifier 1 and trunk pipe 15 for use in the purifiers. Each of the branch pipes 5 is provided with a valve 22 for controlling the amount of air entering the corresponding roll box 6, and each of the branch pipes 16 is provided with a valve 23 for controlling the amount of air entering the corresponding purifier 17. According to the installation shown in Figure 1, the fan 3 is located on the basement floor 24, the roll boxes on the first floor 25, the air purifier on the second floor 26, the purifiers on the third floor 27 and the reels on the fourth floor 28, of a mill. Mounted on the basement floor 24 is an air pump 29 which is connected on its suction side by a pipe 30 with the pipe 2 from which it withdraws purified air and forces it through a pipe 31 into an air tank 32. A discharge pipe 33 leads from the top of the air tank 32, and a line pipe 34, connected to this discharge pipe, leads past the series of branch pipes 5 in parallel relation to a water supply pipe 35. A branch pipe 36 from the air pipe 34, and a branch pipe 37 from the water pipe 35, enter opposite sides of each branch pipe 5 to form an injector, (not shown) which is controlled by a valve 38. By adjusting the valve 38 the proper amount of moisture may be injected into the pipe 5 from the water pipe 35, through the blast of air from the pipe 34, so that the air passing into each roll box may have the required amount of moisture. By entirely closing the valve 38, all moisture may be cut off from the air passing to each roll box, or from one or more of the same; or, as will usually be the case, the amount of moisture supplied to the air passing to the successive roll boxes will be increased progressively from the head to the tail of the mill; that is to say, from the first break roll to the last reduction roll. The pipe 33 is also branched to form a line pipe 39 which passes by the series of branch pipes 16 parallel to a water pipe 40. A branch pipe 41 leading from the pipe 39 and a branch pipe 42 leading from the water pipe 40 enter opposite sides of each of the branch pipes 16 to form an injector (not shown) which is controlled by a valve 43 to regulate the moisture supplied to the air passing through the branch pipes 16 to the purifiers, in the same way as described with reference to the air passing to the roll boxes.

The pipe 2 and trunk pipe 15 communicate with an air box 44 located on the rear or discharge side of the air purifier 1. Extending through this air box (Figures 2 and 3) in parallel relation, is a water pipe 45 and an air pipe 46, which are connected at one end by branch pipes 47 and 48 to the water pipe 40 and air pipe 39, respectively. The pipes 45 and 46 are suitably connected at intervals throughout their length in the box 44 to atomizers 49, so that, if desired, all of the air passing through the purifier 1 may have a certain amount of moisture added to it. Valves 50 and 51 (Figures 1 and 3) control the supply of water and air to the respective pipes 45 and 46.

Figure 2:
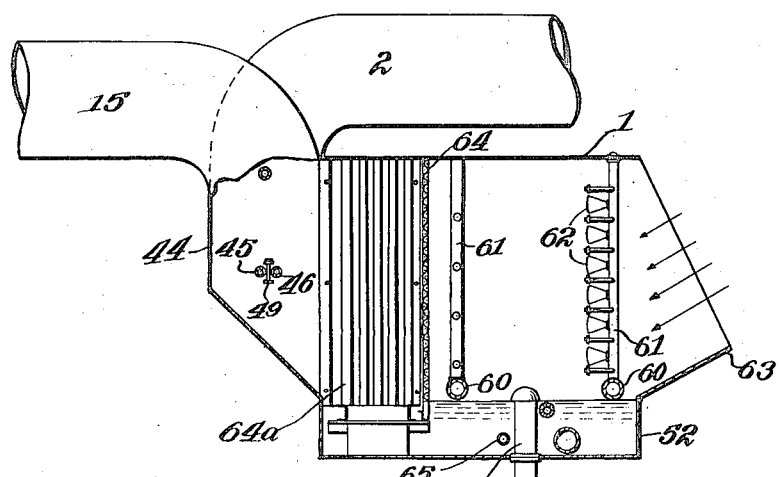
Figure 2 is a transverse sectional view of a standard type of water purifier.
Figure 3:
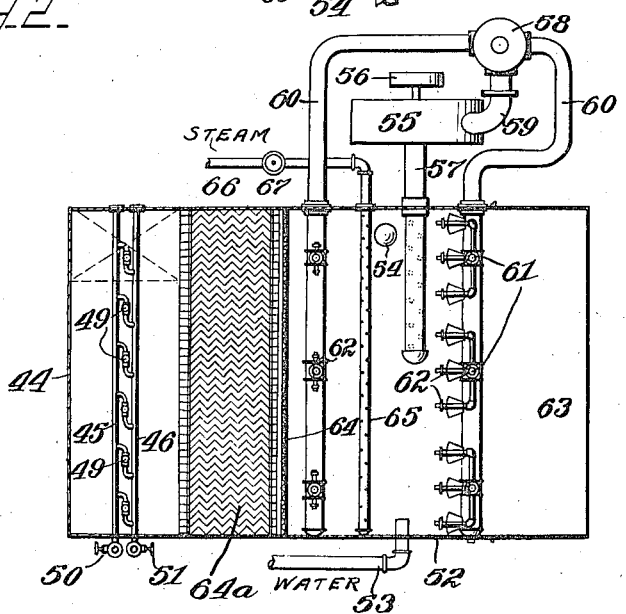
Figure 3 is a top plan view of the same.

Referring to Figures 2 and 3, which illustrate a standard type of air purifier, the numeral 52 indicates a tank which is supplied with water from a pipe 53, which water is maintained at a given level in the tank by means of an overflow pipe 54. The numeral 55 indicates a pump which is driven by a pulley 56 through the medium of a belt (not shown), as usual, and the suction side of which pump is connected by means of a drain pipe 57 with the interior of the tank 52, from which the pump withdraws the water that is used in the spraying devices to be described. The numeral 58 indicates a strainer, which is connected by means of a pipe 59 with the outlet from the pump 55, and pipes 60, lead from said strainer into the interior of the air purifier 1, where said pipes are provided with a plurality of vertical branches 61 provided with various spraying devices 62. The numeral 63 indicates the air inlet to the purifier 1, and air drawn through said inlet by suction in the pipes 2 and 15, as previously described, passes through the sprays of water and atmosphere of mist produced in the purifier 1 by the various spraying devices 62, and all impurities are removed from the air. Before passing into the air box 44 the purified and saturated air passes through a wire screen 64 and then through what is known in the art as an "eliminator." This eliminator is indicated by the numeral 64ª, and consists of a series of vertically disposed plates, longitudinally zig-zagged, or corrugated, and arranged in parallel relation to provide relatively narrow spaces between them, which are in the form of tortuous passages, so that as the air is drawn through these passages it impinges against the various surfaces of the eliminator plates and is caused to deposit its moisture thereon. After passing through the eliminator the air will be as dry as it was normally, except that if the temperature has been raised the amount of moisture it will contain will correspond to the increase in temperature, as well understood. Under any circumstances, however, it will be what is known as dry air, that is to say, the moisture content will be normal relative to the temperature.

In order to increase the temperature of the air I provide a perforated steam pipe 65 extending into the tank 52 which connects with a steam pipe 66 having a valve 67, said steam pipe leading from a source of steam supply. By opening the valve 67 steam is admitted into the water in the tank 52 and heats the same, and as this water is drawn out by the pump 55 and forced through the various spraying devices 62, it will impart its heat to the air drawn through the purifier.

Referring to Figure 1, the numeral 68 indicates a tank containing a bleaching or sterilizing agent, which may be in the form of a volatile liquid, or of a gas. A pipe 69 leads from the tank 68 into the air box 44 and is provided with a valve 70 for shutting off the supply of gas when it is not required. When the valve is opened, the gas passes into the air box 44 and combines with the purified air and is led into the various milling machines where it may exert its action in whitening the product or in killing bugs, or insects, and the like.

From the foregoing description it will be seen that the air drawn in the purifier 1 is first thoroughly washed or purified and is then passed through the eliminator 64ª to cause it to deposit its moisture thereon and to pass into the air box 44 in a relatively dry state. This pure dry air may be used in such condition, and either with its temperature reduced or raised, according to the condition of the product to be treated, the temperature of the mill, and so on. It is contemplated, however, that the process will find its widest application in the employment of the air as cooled by passing through water spray in the purifier 1, and in having its moisture content increased, either by the spraying device in the air box 44, or by the injectors in the various branch pipes 5 and 16, so that the desired amount of moisture may be carried by the air and imparted to the product with which it comes in contact. It will thus be seen that the process provides for absolute control of moisture content of the air, both as respects the total volume of air used and as applies to individual streams of air; and that such control extends from the use of air devoid of all excess moisture to the use of air saturated with any required degree of moisture; and that the variations in the moisture content of air is under the control of the operator at all times, and, as stated, may be increased or diminished as to certain individual streams of air without changing the conditions of other streams of air.

As heretofore indicated, this manner of treating and applying air in a mill enables me to maintain substantially uniform moisture and temperature conditions throughout the entire milling system. This result may be accomplished, on the one hand, by preventing loss or evaporation of moisture by creating conditions in the milling machines which tend to prevent such loss; or, on the other hand, by supplying the requisite amount of moisture to make up for any losses occurring in milling, where such losses, owing to conditions prevail and are inevitable; or, finally, it may be, by utilizing, in part, both preventive and remedial measures simultaneously as respects loss of moisture. The maintenance of uniform moisture and temperature conditions throughout the system, will obviously tend to simplify and maintain uniform the milling operation. That is to say, as important and hitherto variable factors have been made substantially constant and uniform throughout the mill, the machines may be more readily and intelligently adjusted and co-ordinated for the work, and the necessity, now existing, for repeatedly adjusting the machines with reference to these variable factors is largely eliminated.

It remains now to briefly refer to a final feature of the invention which consists in locating an automatic air-valve in the pipe 4, indicated by the numeral 71, the purpose of which is to automatically control the air pressure in the roll boxes so as to eliminate any possibility of blowing, the valve being set to furnish the exact amount of air required. Should the system get too full of air, the automatic valve opens and permits a sufficient amount of the air to escape to reduce the pressure, and when this occurs to the required degree, the valve closes. The only point in the system in which this automatic valve is required is between the blow fan and the exhaust fan, and this for the reason that it would not be well to have the blower put more air in the machines than the exhaust can handle.

I have above recited advantages incident to this invention as the same are related to flour milling. It should be stated in addition, however, that a very pronounced advantage incident to the use of this process is in the great reduction of fire risk due to dust explosion. It will be evident that not only all of the air employed in connection with the various milling machines is purified and freed from dust, but that the added moisture likewise tends to prevent the dispersion of flour dust in the mill; and, finally, there is a constant passage of air into the purifier 1, which tends to decrease the amount of dust circulating in the mill; although as to this latter feature, the effect is somewhat localized, or restricted to the room in which the purifier is located. In actual operation it is found that there is a very marked decrease in the amount of flour dust in the mill and this reduction in dust circulation and deposit in the mill where the process is now practiced is such that the risk of dust explosion is considered to be practically eliminated.

I claim:

1. In the art of milling flour, the method which consists in purifying air by washing the same, thereafter, and independently of the purifying process, controllably adjusting the moisture content of the purified air, and conducting the air thus treated in closed paths to the individual machines of a milling system.

2. In the art of milling flour, the method which consists in purifying air and regulating the temperature thereof, controllably adjusting the moisture content of the purified air independently of the purifying process, and conducting the air thus treated in closed paths to the individual machines of a milling system.

3. In the art of milling flour, the method which consists in purifying and cooling air, thereafter, and independently of the purifying process, controllably adjusting the moisture content of the purified air, and conducting the air thus treated in closed paths to the individual machines of a milling system.

4. In the art of milling flour, the method which consists in purifying air by washing the same, eliminating free moisture from the purified air, controllably supplying moisture to the air thus treated, and thereafter conducting the air to the individual machines of a milling system.

5. The method which consists in purifying air, independently regulating the moisture content thereof in a plurality of independent streams, and conducting the independent streams of air thus treated respectively to individual machines of a flour mill.

6. The method which consists in washing air to purify the same, then removing excess moisture from the air, conducting individual streams of the air to individual machines of a flour mill, and during its passage to such machines supplying regulated amounts of moisture thereto.

7. The method which consists in cooling and purifying air by passing it through a moisture laden atmosphere, removing excess moisture from the air, conducting the air thus treated in separated streams to individual machines of a flour mill, and in its passage to such machines supplying in each instance regulated amounts of moisture to the respective streams of air.

8. The process of milling flour, which consists in subjecting the stock during its reduction from wheat to flour to moistened air supplied in separated streams to individual machines involved in the milling operation, the moisture content of the air being independently regulated in the various streams.

9. The process of milling flour, which consists in subjecting the stock during its reduction from wheat to flour to moistened air supplied to the rolls of the mill in separated streams, the moisture content of the air being independently regulated in the various streams.

10. The process of milling flour, which consists in subjecting the stock during its reduction from wheat to flour to moistened air supplied to the rolls of the mill in separated streams, the moisture content of the streams of air being progressively increased from the head to the tail of the mill.

11. The process of milling flour, which consists in subjecting the stock during its reduction from wheat to flour to cooled and moistened air supplied in separated streams to individual machines involved in the milling operation, the moisture content of the air being independently regulated in the various streams.

12. The process of milling flour, which consists in subjecting the stock during its reduction from wheat to flour to cooled and moistened air supplied to the rolls of the mill in separated streams, the moisture content of the air being independently regulated in the various streams.

13. The process of milling flour which consists in subjecting the stock during its reduction from wheat to flour to moistened air supplied in separated streams to individual machines involved in the milling operation, the moisture content of the air being independently regulated in the various streams, and the passage of the air to the machines being quantitatively regulated.

14. The process of milling flour, which consists in subjecting the stock during its reduction from wheat to flour to purified air supplied to the various milling machines in separated streams emanating from a common source and supplying the purified air at said source with a gas for acting on the flour.

15. The process of milling flour which consists in subjecting the stock during its reduction from wheat to flour to cooled and moistened air supplied in separated streams to individual machines involved in the milling operation, the moisture content of the air being independently regulated in the various streams, and the passage of the air to the respective machines being independently and quantitatively regulated.

16. The process of milling flour which consists in starting the milling operation with stock having a given maximum moisture content, maintaining a substantially like moisture content of the stock throughout the milling operation, and delivering the finished flour with a moisture content controllably proportioned to that of the initial stock.

17. The process of milling flour which consists in starting the milling operation with stock having a given maximum moisture content, maintaining a substantially like moisture content and uniform temperature of the stock throughout the milling operation, and delivering the finished flour with a moisture content controllably proportioned to that of the initial stock.

18. The process of milling flour which consists in maintaining the stock during its reduction from wheat to flour substantially uniform in the factors of moisture and temperature by producing and maintaining in the varios machines of the mill an atmosphere having a controllable moisture content and temperature.

19. The process of milling flour which consists in maintaining the stock during its reduction from wheat to flour substantially uniform in the factors of temperature and moisture, by controllably supplying air of the desired temperature and moisture content to the various machines in the mill in a closed path.

20. The process of milling flour which consists in maintaining the stock during its reduction from wheat to flour substantially uniform in the factors of temperature and moisture by operating the various machines of the mill in closed circuits through which air having a controllable temperature and moisture content is circulated and simultaneously supplied to all of said machines.

In testimony whereof, I have hereunto set my hand.

ALFRED W. WOOLCOTT.